United States Patent
Kataoka et al.

(10) Patent No.: US 10,062,404 B2
(45) Date of Patent: Aug. 28, 2018

(54) METHOD FOR MANUFACTURING PERPENDICULAR MAGNETIC RECORDING MEDIUM

(71) Applicant: FUJI ELECTRIC CO., LTD., Kawasaki-shi (JP)

(72) Inventors: Hiroyasu Kataoka, Sendai (JP); Hiroto Kikuchi, Sendai (JP); Akira Furuta, Sendai (JP); Takehito Shimatsu, Sendai (JP)

(73) Assignee: Fuji Electric Co., Ltd., Kawasaki-shi (JP)

( * ) Notice: Subject to any disclaimer, the term of this patent is extended or adjusted under 35 U.S.C. 154(b) by 29 days.

(21) Appl. No.: 15/102,639

(22) PCT Filed: May 12, 2015

(86) PCT No.: PCT/JP2015/002412
§ 371 (c)(1),
(2) Date: Jun. 8, 2016

(87) PCT Pub. No.: WO2015/174083
PCT Pub. Date: Nov. 19, 2015

(65) Prior Publication Data
US 2017/0125050 A1  May 4, 2017

(30) Foreign Application Priority Data

May 12, 2014  (JP) .................................. 2014-098614

(51) Int. Cl.
*G11B 5/65* (2006.01)
*G11B 5/66* (2006.01)
(Continued)

(52) U.S. Cl.
CPC .............. *G11B 5/851* (2013.01); *G11B 5/653* (2013.01); *G11B 5/66* (2013.01); *G11B 5/732* (2013.01); *G11B 5/8404* (2013.01)

(58) Field of Classification Search
CPC ........... G11B 5/653; G11B 5/66; G11B 5/667; B05D 3/02; B05D 3/0254; B05D 3/0263; B05D 3/0272; B05D 3/0281; B05D 3/029
See application file for complete search history.

(56) References Cited

U.S. PATENT DOCUMENTS 8,320,232 B1  11/2012  Marinero et al.
2004/0196593 A1  10/2004  Yasui et al.
(Continued)

FOREIGN PATENT DOCUMENTS

JP  08-083418 A  3/1996
JP  2003-006830 A  1/2003
(Continued)

OTHER PUBLICATIONS

Perumal et al., "$L1_0$ FePt—C Nanogranular Perpendicular Anisotropy Films with Narrow Size Distribution," Applied Physics Express 1 (2008) 101301-1-101301-3.
(Continued)

*Primary Examiner* — Carson Gross
(74) *Attorney, Agent, or Firm* — Venable LLP; Michael A. Sartori; Kerri M. Patterson

(57) ABSTRACT

A method for manufacturing perpendicular magnetic recording medium which includes magnetic recording layer having desired film thickness while maintaining high magnetic anisotropy and having more homogenized magnetic characteristics. The method includes: (A) preparing non-magnetic substrate; (B) laminating magnetic recording layer on the substrate; and (C) heating the substrate on which the magnetic recording layer is laminated to a temperature of 400 to
(Continued)

600° C. The step (B) includes at least forming a first magnetic recording layer and a second magnetic layer thereon. The first layer has a granular structure including a first magnetic crystal grain constituted by an ordered alloy surrounded by a first non-magnetic grain boundary constituted by carbon, and the second layer has a granular structure including a second magnetic crystal grain constituted by an ordered alloy surrounded by a second non-magnetic grain boundary constituted by a non-magnetic material constituted by boron and carbon.

9 Claims, 7 Drawing Sheets

(51) Int. Cl.
G11B 5/851 (2006.01)
G11B 5/84 (2006.01)
G11B 5/73 (2006.01)

(56) References Cited

U.S. PATENT DOCUMENTS

| 2006/0051622 | A1* | 3/2006 | Shin | G11B 5/653 |
| | | | | 428/836.1 |
| 2007/0259210 | A1* | 11/2007 | Ichihara | C23C 14/042 |
| | | | | 428/692.1 |
| 2010/0159283 | A1 | 6/2010 | Ibusuki et al. | |
| 2012/0196154 | A1 | 8/2012 | Uchida | |
| 2012/0300600 | A1 | 11/2012 | Kanbe et al. | |
| 2013/0208578 | A1 | 8/2013 | Kanbe et al. | |
| 2014/0366990 | A1* | 12/2014 | Lai | G11B 5/84 |
| | | | | 148/121 |
| 2014/0377590 | A1 | 12/2014 | Uchida | |
| 2015/0138939 | A1* | 5/2015 | Hellwig | G11B 5/66 |
| | | | | 369/13.41 |

FOREIGN PATENT DOCUMENTS

| JP | 2004-311607 A | 11/2004 |
| JP | 2008-097824 A | 4/2008 |
| JP | 2010-102757 A | 5/2010 |
| JP | 2011-154746 A | 8/2011 |
| JP | 2012-160242 A | 8/2012 |
| JP | 2013-025862 A | 2/2013 |
| JP | 2013-168197 A | 8/2013 |
| WO | WO-2013/140469 A1 | 9/2013 |

OTHER PUBLICATIONS

Inaba et al. "New High Density Recording Technology: Energy Assisted Recording Media," Fuji-jiho, vol. 83, No. 4, 2010, pp. 257-260.

R.F. Penoyer, "Automatic Torque Balance for Magnetic Anisotropy Measurements," Review of Scientific Instruments, Aug. 1959, vol. 30, No. 8, pp. 711-714.

S. Chikazumi, "Physics of Ferromagnetism vol. II," Shokabo Co., Ltd., pp. 10-21.

Shimatsu et al., "Thermal stability in perpendicular recording media," Journal of Magnetism and Magnetic Materials, 235 (2001) pp. 273-280.

Sharrock, "Time dependence of switching fields in magnetic recording media (invited)," J. Appl. Phys., 76 (1994) pp. 6413-6418.

Kitakami et al., "On Magnetization Reversal of Co—Cr Films with Perpendicular Anisotropy," Jpn. J. Appl. Phys., 40 (2001) pp. 4019-4022.

International Search Report in PCT International Application No. PCT/JP2015/002412 dated Jul. 28, 2015.

Written Opinion from the International Searching Authority in PCT International Application No. PCT/JP2015/002412 dated Jul. 28, 2015.

Decision to Grant a Patent in Japanese Patent Application No. 2015-550103 dated Dec. 15, 2015.

* cited by examiner

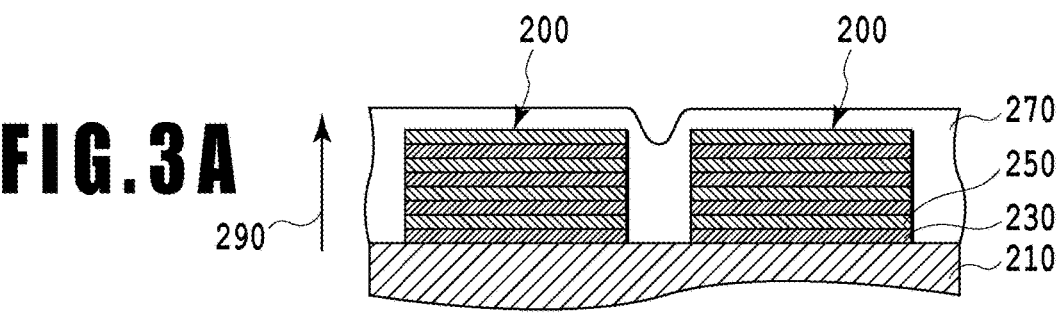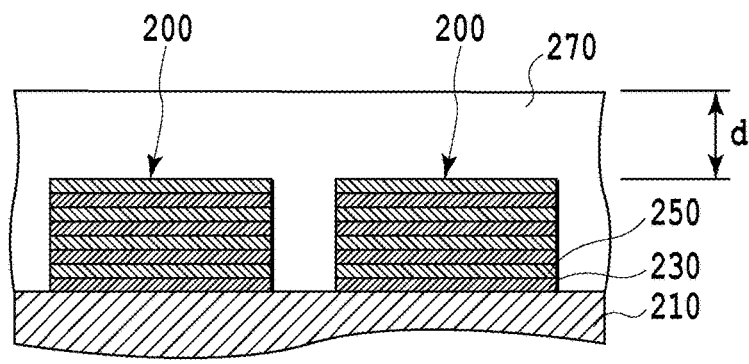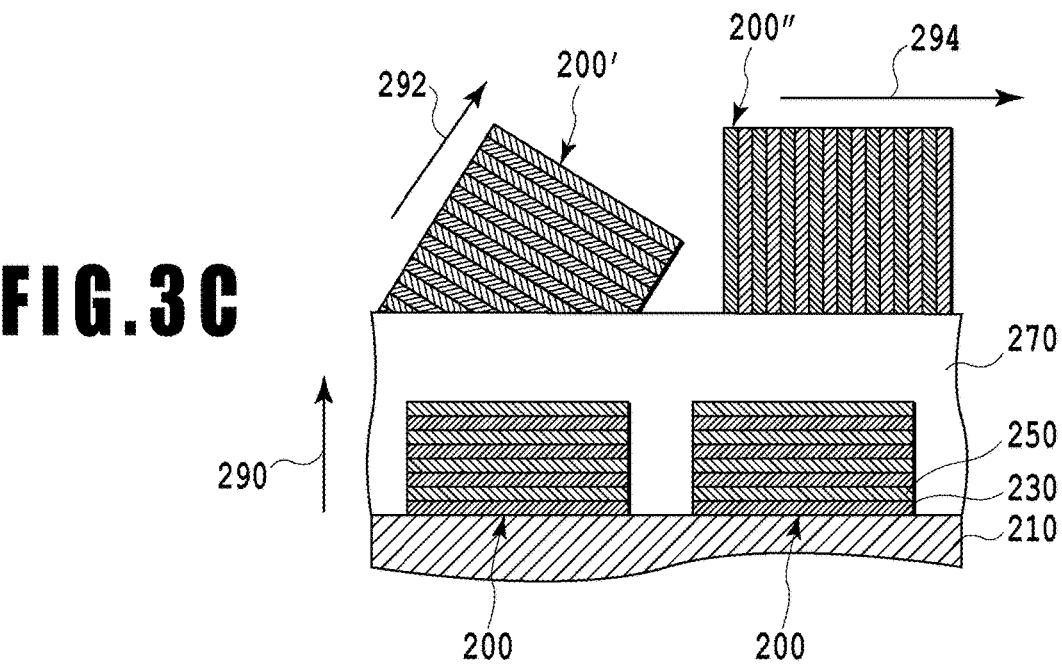

NO POST-HEATING PROCESSING

COMPARATIVE EXAMPLE 3
AVERAGE GRAIN SIZE
$\langle D \rangle$ = 8.0nm
$\sigma$ = 1.45 nm POST-HEATING PROCESSING (400°C 2h)

EXAMPLE 4
AVERAGE GRAIN SIZE
$\langle D \rangle$ = 7.6nm
$\sigma$ = 1.45 nm

METHOD FOR MANUFACTURING PERPENDICULAR MAGNETIC RECORDING MEDIUM

TECHNICAL FIELD

The present invention having several configuration examples disclosed in this Description relates to a manufacturing method of a perpendicular magnetic recording medium.

BACKGROUND ART

Recently, higher density magnetic recording is in high demand. As a technology for realizing high density of a magnetic recording, a perpendicular magnetic recording method is employed. The perpendicular magnetic recording medium based on this method includes at least a non-magnetic substrate and a magnetic recording layer including a hard magnetic material. The perpendicular magnetic recording medium may further optionally include, in addition to the elements, a soft magnetic underlayer which is formed from a soft magnetic material and plays a role for concentrating a magnetic flux generated by a magnetic head to the magnetic recording layer, an underlayer for orienting the hard magnetic material of the magnetic recording layer in an intended direction, a protective film for protecting a surface of the magnetic recording layer and the like.

As a material for forming a magnetic recording layer of the perpendicular magnetic recording medium, a granular magnetic material is used. This granular magnetic material is composed of a magnetic material and a non-magnetic material, and results in a granular structure composed of a magnetic crystal grain and precipitated non-magnetic material surrounding the periphery of the magnetic crystal grains. In the magnetic material, an ordered alloy, for example, has attracted attention in recent years, while in the non-magnetic material, carbon system, oxide system, nitride system and the like are known (see PTL 1 and the like, for example).

In the perpendicular magnetic recording medium, various materials are proposed for the granular magnetic material, but depending on a combination of the ordered alloy as the magnetic crystal grains and the non-magnetic material, if a film thickness of the magnetic recording layer increases, a phenomenon that the non-magnetic material precipitates not only on the grain boundary of the magnetic crystal grains but also on the surface of the magnetic crystal grains and interferes with growth of the magnetic crystal grains occurs in some cases (see NPL 1). If the film thickness of the magnetic recording layer further increases after such precipitation on the surface occurs, so-called secondary growth occurs that the magnetic crystal grains grow on the non-magnetic material having precipitated to the surface of the magnetic crystal grains. Such secondary growth results in lowering of magnetic anisotropy of the perpendicular magnetic recording medium.

Thus, various materials are examined also for the non-magnetic material contained in the granular magnetic material. For example, PTL 2 discloses a perpendicular magnetic recording medium containing a magnetic recording layer using $B_4C$ as the non-magnetic material. PTL 2 reports that high thermal stability, high magnetic anisotropy constant (Ku) and the like can be realized and a DC sputtering method enables the film formation. However, PTL 2 does not refer to use of $B_4C$ in combination with an ordered alloy.

PTL 3 discloses a thermal assist magnetic recording medium having a magnetic layer with a double structure using the granular magnetic material in which an oxide such as $SiO_2$ is added as a non-magnetic material to an ordered alloy having an $L1_0$-type crystalline structure as a first magnetic layer and a continuous layer (CAP layer) not containing such oxide as a second magnetic layer. The invention of PTL 3 is characterized in that a content of the non-magnetic material in the first magnetic layer decreases from the substrate side toward the second magnetic layer side, and this constitution prevents precipitation of excessive non-magnetic material on an upper part of the crystal grains of the ordered alloy so as not to interrupt the growth of the crystal grains in a perpendicular direction. Moreover, as a result, crystal grains of the ordered alloy having a fine grain size and continuously grown in a direction perpendicular to a substrate surface are realized.

CITATION LIST

Patent Literature

PTL 1: Japanese Patent Laid-Open No. H08-083418 (1996)
PTL 2: Japanese Patent Laid-Open No. 2008-097824
PTL 3: Japanese Patent Laid-Open No. 2011-154746
PTL 4: Japanese Patent Laid-Open No. 2004-311607
PTL 5: Japanese Patent Laid-Open No. 2003-6830

Non Patent Literature

NPL 1: Appl. Phys. Express, 101301, 2008
NPL 2: Fuji-jiho, vol. 83, No. 4, 2010, pp. 257 to 260
NPL 3: R. F. Penoyer, Rev. Sci. Instr. 30 (1959), p. 711
NPL 4: Physics of Ferromagnetism (Vol. II), Soshin Chikazumi, Shokabo, pp. 10 to 21 (Japanese)
NPL 5: T. Shimatsu, H. Uwazumi, H. Muraoka, Y. Nakamura, J. Magn Magn. Mater. 235 (2001) 273 to 280
NPL 6: M. P. Sharrock, J. Appl. Phys., 76, 6413 (1994)
NPL 7: O. Kitakami and Y. Shimada, Jpn. J. Appl. Phys., 40, 4019 (2001)

SUMMARY OF INVENTION

Technical Problem

In a perpendicular magnetic recording medium, high magnetic anisotropy needs to be maintained. Moreover, in the perpendicular magnetic recording medium, the ordered alloy in the granular structure is desired to be fine-grained (see PTL 3). Moreover, in recent years, an energy-assist type magnetic recording medium such as a thermal assist type, a micro-wave assist type and the like attracts attention as the aforementioned magnetic recording medium with high density (see NPL 2). In these energy-assist type magnetic recording mediums, the study by the present inventors has revealed that it is advantageous that a magnetic recording layer has an appropriate film thickness. As described above, there is a demand that the magnetic recording layer of the perpendicular magnetic recording medium, including a fine ordered alloy, provide a predetermined film thickness while maintaining high magnetic anisotropy.

It has not been possible, however, to realize a film thickness sufficient as a single layer by conventionally used combination of an ordered alloy with a non-magnetic material.

Moreover, regarding the recent perpendicular magnetic recording medium, a study is keenly conducted on constituting the magnetic recording layer by the ordered alloy—non-magnetic material forming the granular structure composed of the magnetic crystal grains made of the ordered alloy and the non-magnetic grain boundary surrounding them, but the magnetic recording medium which realizes a predetermined film thickness while maintaining a sufficiently high magnetic anisotropy has not been obtained. For example, in a $L1_0$-type ordered alloy—non-magnetic material such as FePt—C and FePt—$SiO_2$, the study by the present inventors has revealed some problems including a problem of a so-called secondary growth of the magnetic crystal grains associated with an increase in a film thickness of the magnetic recording layer, and a problem that the granular structure cannot be formed on a specific seed layer.

For example, if an $L1_0$-type FePt—C material is deposited on seed layer 210 made of MgO or the like in a perpendicular direction by the sputtering method (FIGS. 3A and 3B), a structure (230, 250) in which a Fe atom layer and a Pt atom layer are alternately laminated as illustrated in a crystal lattice view of an $L1_0$-type FePt alloy in FIG. 2 is formed [axis of easy magnetization 290, FIG. 3A].

However, if the deposition of FePt—C further makes progress to further thicken the film, carbon enters onto a surface of the magnetic crystal grains, and is deposited on the surface of the magnetic crystal grains (d in FIG. 3B) to result in preventing the growth of the magnetic crystal grains 200 (FIG. 3B). If the deposition of FePt—C much further makes progress, the secondary growth of the magnetic crystal grains occurs [(FIG. 3C), magnetic crystal grains 200', 200"], to result in a decrease of magnetic anisotropy as the entire magnetic recording layer.

Therefore, it was found to be difficult to increase a film thickness with the FePt—C single layer while maintaining high magnetic anisotropy.

Meanwhile, a magnetic recording medium with the granular structure, being made of a magnetic material containing $B_4C$ as the non-magnetic material, is known (PTL 2). However, the magnetic recording medium actually made in this document does not use an ordered alloy.

For example, if a seed layer 210 made of MgO or the like is used, as illustrated in FIG. 4, FePt magnetic crystal grain 200 is formed from FePt—$B_4C$ (FIG. 4A). However, the study by the present inventors has revealed that non-magnetic grain boundary 320 surrounding this magnetic crystal grain is not formed or if formed, very negligible (FIG. 4B). Thus, the magnetic crystal grains are not separated completely from each other but are brought into a mixed state (400).

Though not bound by a theory, this is considered that $B_4C$ as a non-magnetic material is not precipitated readily from the FePt magnetic crystal grains, and even if the FePt magnetic crystal grains grow, they remain in the crystals. As described above, if the non-magnetic material remains in the magnetic crystal grains, with the progress of deposition of FePt—$B_4C$, $B_4C$ also grows in the magnetic crystal grains and leads to gradual breakage of the magnetic crystal grains. Such breakage lowers the magnetic anisotropy.

As described above, the study of the present inventors has revealed that the FePt—$B_4C$ material does not also ensure thick film formation with a single layer.

In such circumstances, the present inventors found that by forming on the seed layer in advance an ordered alloy-carbon (FePt—C, for example) layer having a granular structure as a template layer, an ordered alloy-carbide (FePt—$B_4C$, for example) layer can grow on this ordered alloy-carbon, while the ordered alloy-carbide forms the granular structure to result in formation of a magnetic recording layer with a desired film thickness.

However, the present inventors found that even if a heating temperature increases during film formation of a magnetic recording layer, no improvement in homogenization of magnetic characteristics is observed. Thus, it is further demanded that fluctuation of an magnetic anisotropy constant (Ku) of each magnetic grain contained in the magnetic recording layer with a desired film thickness obtained as above be reduced to further homogenize the magnetic characteristics.

Therefore, the invention having several configuration examples disclosed in this Description has an object to provide a manufacturing method of a perpendicular magnetic recording medium including a magnetic recording layer having a desired film thickness and reduced fluctuation in an magnetic anisotropy constant (Ku) of each magnetic grain and more homogenized magnetic characteristics while maintaining high magnetic anisotropy.

Solution to Problem

A method for manufacturing a perpendicular magnetic recording medium according to one configuration example of the present invention is a manufacturing method of a perpendicular magnetic recording medium including the steps of:

(A) preparing a non-magnetic substrate;
(B) laminating magnetic recording layer including at least a first and a second magnetic recording layers on the non-magnetic substrate; and
(C) heating the non-magnetic substrate on which the magnetic recording layer is laminated to a temperature of 400 to 600° C., wherein the step (B) includes at least a step of forming the first magnetic recording layer and a step of laminating the second magnetic recording layer on the first magnetic recording layer;

the first magnetic recording layer has a granular structure including a first magnetic crystal grain and a first non-magnetic grain boundary surrounding the first magnetic crystal grain, the first magnetic crystal grain is constituted by an ordered alloy, and the first non-magnetic grain boundary is constituted by carbon; and the second magnetic recording layer has a granular structure including a second magnetic crystal grain and a second non-magnetic grain boundary surrounding the second magnetic crystal grain, the second magnetic crystal grain is constituted by an ordered alloy, and the second non-magnetic grain boundary is constituted by a non-magnetic material constituted by boron and carbon.

In the aforementioned manufacturing method, the first magnetic recording layer having the granular structure of the ordered alloy-carbon (FePt—C, for example) is preliminarily formed, and this first magnetic recording layer works as a template layer. Then, as the second magnetic recording layer on this template layer, the granular structure of the non-magnetic material constituted by the ordered alloy-boron and carbon can be formed/grown. The obtained magnetic recording layer can have a desired film thickness and high magnetic anisotropy.

Moreover, in the aforementioned manufacturing method after formation of the magnetic recording layer, it is heated to the predetermined temperature in the step (c). This step enables to reduce fluctuation of magnetic anisotropy constant (Ku) of each magnetic grain in the magnetic recording layer to further homogenize the magnetic characteristics.

Advantageous Effects of Invention

The aforementioned manufacturing method enables to thicken the magnetic layer while maintaining high magnetic anisotropy, and to manufacture a perpendicular magnetic recording medium with magnetic characteristics further homogenized by reducing fluctuation in magnetic anisotropy constant (Ku) of each magnetic grain.

BRIEF DESCRIPTION OF DRAWINGS

FIG. 3A is a schematic view for explaining a problem point in a course of growth of a granular magnetic material (FePt—C) of the magnetic recording layer;

FIG. 3B is a schematic view for explaining a problem point in a course of growth of a granular magnetic material (FePt—C) of the magnetic recording layer;

FIG. 3C is a schematic view for explaining a problem point in a course of growth of a granular magnetic material (FePt—C) of the magnetic recording layer;

DESCRIPTION OF EMBODIMENTS

Figure 1:
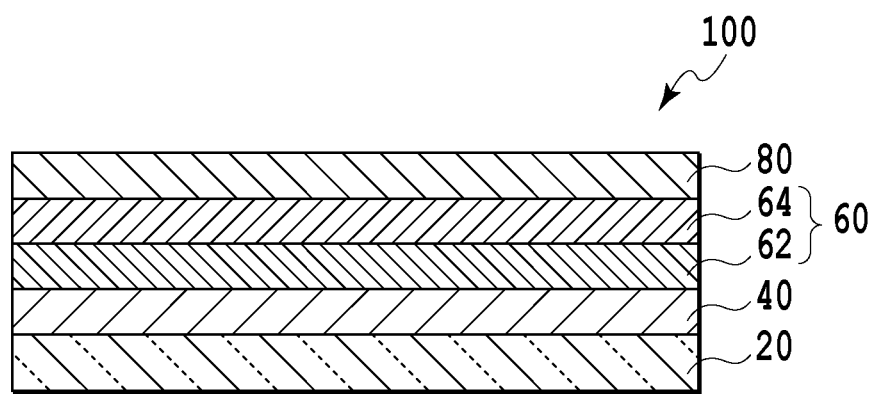
FIG. 1 is a schematic sectional view illustrating an embodiment of a perpendicular magnetic recording medium that can be manufactured by a manufacturing method of one configuration example of the present invention.
Figure 2:
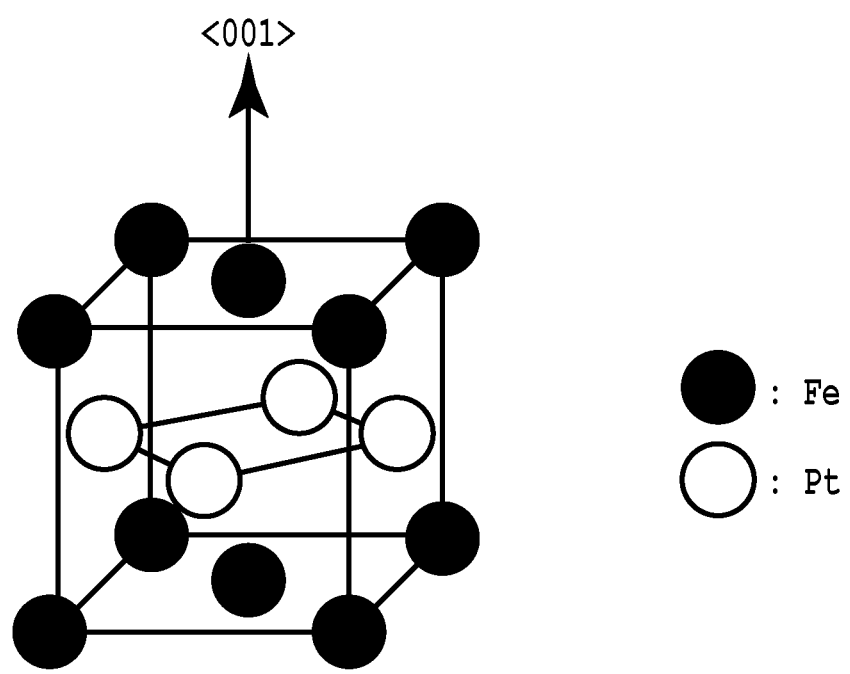
FIG. 2 is a schematic view illustrating a crystal structure of an $L1_0$-type ordered alloy that can be used in one configuration example of the present invention.
Figure 4A:
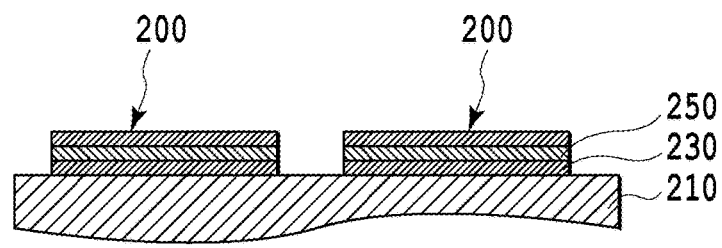
FIG. 4A is a schematic view for explaining a course of growth of a granular magnetic material (FePt—$B_4C$) of the magnetic recording layer.
Figure 4B:
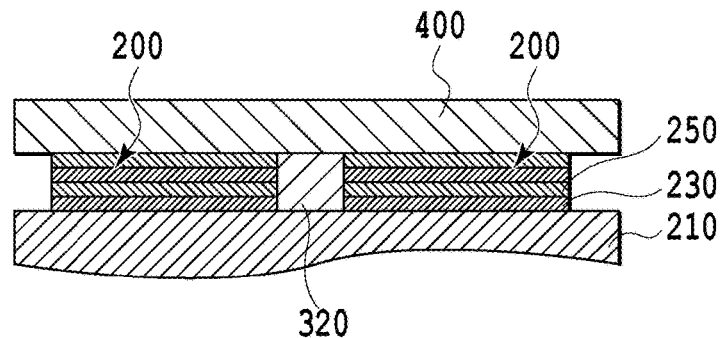
FIG. 4B is a schematic view for explaining a course of growth of a granular magnetic material (FePt—$B_4C$) of the magnetic recording layer.

A manufacturing method of one configuration example of the present invention will be described below by using reference numerals described in FIG. 1.

[Step (A)]

This is a step of preparing a non-magnetic substrate.

Non-magnetic substrate 20 may be any of various substrates having smooth surfaces. For example, the non-magnetic substrate 20 may be formed by using a material generally used for a magnetic recording medium. For example, materials such as an Al alloy to which NiP plating is applied, strengthened glass, and crystallized glass may be used as the non-magnetic substrate.

[Step (B)]

This is a step of laminating magnetic recording layer including at least a first and a second magnetic recording layers on the non-magnetic substrate.

(Magnetic Recording Layer 60)

Magnetic recording layer 60 includes at least two layers, that is, first magnetic recording layer 62 and second magnetic recording layer 64. The second magnetic recording layer is laminated on the first magnetic recording layer.

First magnetic recording layer 62 has a granular structure including a first magnetic crystal grain constituted by an ordered alloy and a first non-magnetic grain boundary constituted by carbon, the first non-magnetic grain boundary surrounding the first magnetic crystal grain, and Second magnetic recording layer 64 has a granular structure including a second magnetic crystal grain constituted by an ordered alloy and a second non-magnetic grain boundary constituted by a non-magnetic material constituted by boron and carbon, the second non-magnetic grain boundary surrounding the second magnetic crystal grain.

The ordered alloy constituting the first magnetic crystal grain and the second magnetic crystal grain in the first and second magnetic recording layers may be the same kind or different kinds from each other, but an $L1_0$-type ordered alloy is preferable. Particularly, an $L1_0$-type ordered alloy containing at least one kind of an element selected from Fe, Co, Ni, and the like and at least one kind of an element selected from Pt, Pd, Au, Cu, Ir and the like is preferable. More preferably, it is an $L1_0$-type ordered alloy constituted by a material selected from a group consisting of FePt, CoPt, FePd, and CoPd and most preferably, it is an $L1_0$-type FePt ordered alloy.

As the non-magnetic material constituted by boron and carbon, various two-component materials of boron and carbon can be exemplified, and more specifically, various boron carbides such as BC to $B_6C$ can be contained.

A carbon content in the first magnetic recording layer is preferably 20 to 50 vol. %, more preferably 20 to 40 vol. %, in view of the magnetic characteristics and grain size.

A content of the non-magnetic material constituted by boron and carbon in the second magnetic recording layer is preferably 20 to 50 vol. %, more preferably 20 to 30 vol. %, in view of the magnetic characteristics and grain size.

Moreover, a ratio [B (at. %)/C (at. %)] based on the atomic percent ratio of boron and carbon in the non-magnetic material constituted by boron and carbon constituting the second non-magnetic grain boundary is preferably 0.3 or more, more preferably 0.4 or more, preferably 10 or less and more preferably 5 or less, in view of the magnetic characteristics.

Magnetic recording layer 60 may have a structure obtained by laminating more than two magnetic recording layers. For example, magnetic recording layer 60 may have a structure obtained by laminating plural sets, each set being composed of the first and the second magnetic recording layers. Alternatively, magnetic recording layer 60 may have a structure including additional magnetic recording layer made of a material different from the first and the second magnetic recording layers in terms of a composition or a constituent element, the additional magnetic recording layer being laminated on the first and the second magnetic recording layers. Moreover, magnetic recording layer 60 may have a structure in which the first magnetic recording layer, the second magnetic recording layer, and the first magnetic recording layer are laminated in this order.

(Film Formation of Magnetic Recording Layer 60)

First magnetic recording layer 62 is formed on non-magnetic substrate 20 or preferably on seed layer 40 which will be described later, by a sputtering method using a target such as an alloy target having a mixture of metals constituting an ordered alloy and carbon, a vacuum deposition method or the like.

Subsequently, second magnetic recording layer 64 is formed on first magnetic recording layer 62. Second magnetic recording layer 64 can be formed by the sputtering method using a target such as an alloy target having a mixture of metals constituting an ordered alloy and desired carbon and boron, or the vacuum deposition method.

In the manufacturing method of one configuration example of the present invention, non-magnetic substrate 20 on which a film is to be formed or non-magnetic substrate 20 on which an appropriate constituent layer has been formed is preferably heated to a temperature of 300 to 500° C., when a film of a magnetic recording layer is formed, in view of promoting ordering of the ordered alloy, preferably $L1_0$-type ordered alloy.

In the manufacturing method of one configuration example of the present invention, a co-sputtering method of individually sputtering ordered alloy (Fe, Pt, for example) and C or their alloy can be also employed for a method of forming first magnetic recording layer 62 and second magnetic recording layer 64 other than the sputtering method using the alloy target as above.

In the manufacturing method of one configuration example of the present invention, second magnetic recording layer 64 is formed on first magnetic recording layer 62, by using a granular magnetic material containing the second non-magnetic material constituted by the non-magnetic material constituted by boron and carbon, the first magnetic recording layer having a granular structure containing the first non-magnetic material constituted by carbon. As a result, the second magnetic recording layer 64 having a granular structure following the granular structure of the first magnetic recording layer can be formed efficiently, and maintenance of high magnetic anisotropy and increased film thickness of entire magnetic recording layer 60 can be realized.

A film thickness of the first magnetic recording layer is preferably 4 nm or less, more preferably 2 to 4 nm, in view of suppression of growth inhibition and secondary growth of an ordered alloy. Moreover, in view of maintenance of high magnetic anisotropy, a film thickness of the second magnetic recording layer is preferably 3 to 7 nm.

In view of achieving both high productivity and high recording density, magnetic recording layer 60 preferably has a film thickness of at least 5 nm or more, preferably 8 nm or more. The preferable film thickness as magnetic recording layer 60 is 6 to 16 nm, more preferably 8 to 11 nm. Furthermore, the magnetic recording medium of one configuration example of the present invention preferably has a value of the magnetic anisotropy constant (Ku) of at least $1.0 \times 10^7$ erg/cm$^3$ or more, more preferably $1.2 \times 10^7$ erg/cm$^3$ or more.

[Step (C)]

This is a step of heating the non-magnetic substrate on which the magnetic recording layer including the first and second magnetic recording layers is formed, to a temperature of 400 to 600° C. In order to discriminate it from the heat processing of film formation of the magnetic recording layer in the step (B), it may be also called post-heating processing.

By means of this step, fluctuation in magnetic anisotropy constant (Ku) of each magnetic grain in the magnetic recording layer can be reduced, and the magnetic characteristics can be further homogenized.

By means of this step, movement of the non-magnetic material constituted by boron and carbon in the magnetic recording layer or particularly in the second magnetic recording layer into the non-magnetic grain boundary is accomplished further completely. Thus, a degree of order of the ordered alloy in the magnetic recording layer is further improved, and homogeneity of the magnetic characteristics is considered to be also improved.

This step is performed at least after formation of magnetic recording layer 60 in the step (B).

This step can be performed by using a thermal processing furnace capable of decompression to vacuum, and a degree of vacuum is preferably $10^{-4}$ Pa or less in view of prevention of characteristic deterioration caused by oxidation of the magnetic layer.

Such homogenization of the magnetic characteristics can be estimated from α value of a magnetic hysteresis curve of the magnetic recording medium obtained with magnetization M (emu/cm$^3$) as the vertical axis and external magnetic field H (Oe) as the lateral axis. Here, the α value is a gradient of the magnetic hysteresis curve in the vicinity of coercive force Hc, and it is defined by $\alpha = 4\pi (dM/dH)_{H=Hc}$. In view of the homogenization of the magnetic characteristics, the α value is preferably 0.8 or more, more preferably 1.0 or more, and in view of isolation of the grains, the α value is preferably 2.0 or less, more preferably 1.4 or less.

In the case of an ideal granular medium, it is known that the α value is 1.

According to NPL 7, it is assumed that, in a perpendicular magnetized film, a demagnetizing factor in a film-surface perpendicular direction is $N_{film}$ and the demagnetizing factor in the film-surface perpendicular direction in a micro inversion region corresponding to one grain in the case of the granular structure is $N_B$. Then, the magnetic hysteresis curve is inclined with $1/(N_{film}-N_B)$, when a magnetic field is applied in the perpendicular direction of this film. Therefore, the α value is $4\pi/(N_{film}-N_B)$.

Here, the aforementioned $N_{film}$ is approximately $4\pi$.

Then, the aforementioned $N_B$ is determined by a relation between a micro inversion region and the film thickness (δ), and assuming that a diameter of the micro inversion region corresponding to the grain size in the granular structure is D, the larger δ/D is, the closer $N_B$ gets to 0.

Therefore, if the grain in the granular structure is fully isolated and has a film thickness larger than the grain size, the α value gets closer to 1.

Alternatively, if the grain is not fully isolated, $N_B$ takes a larger value since δ/D becomes smaller. Thus, the α value also takes a larger value.

As described above, assuming a state in which the magnetic characteristics are uniform in the entire film, the α value becomes 1 or more, and if it is an isolated grain and δ/D is smaller, the α value gets closer to 1. If the α value is smaller than 1, it can be considered to be a state in which the magnetic characteristics are non-uniform in the film.

Moreover, a heat processing is preferably included also in the film forming step of the magnetic recording layer in the step (B). However, the magnetic grain tends to be enlarged in the heat processing of the film forming step. Thus, it is not advantageous from the view point of micronizing of magnetic grains. Moreover, even if a temperature of the magnetic recording layer in the film forming step increases, the $\alpha$ value is not improved. By contrast, with the heat processing after the film formation of magnetic recording layer as in the step of the present invention, the magnetic grains in the formed magnetic recording layer are not enlarged as long as staying within the predetermined temperature range, and the $\alpha$ value can be improved.

The heating temperature of the substrate in this step is from 400 to 600° C. In view of homogenization of the magnetic characteristics, it is 400° C. or more, while in view of prevention of enlargement of the grains caused by heating, it is 600° C. or less.

Moreover, the heat processing time of this step is preferably 10 seconds or more, more preferably 1000 seconds or more, in view of homogenization of the magnetic characteristics, while it is preferably 2 hours or less, more preferably 1000 seconds or less, in view of mass productivity.

By the way, PTL 4 discloses a technology of depositing a magnetic body from a plating solution, the magnetic body being CoPt or FePt alloy magnetic body containing at least one or more elements of Cu, Ni, and B in 1 at. % to 40 at. %, and transforming it into the $L1_0$ ordered alloy by anneal processing at 500° C. or less (Claim 8 in PTL 4, for example). However, what is actually prepared is $Fe_{28}Ni_{22}Pt_{45}B_5$ to which Ni and B are added using co-deposit of B with Ni in order to include B effectively (the paragraphs 0055 to 0056 and the like in PTL 4), and thus it does not contain a part constituted by a non-magnetic material comprising boron and carbon. Moreover, it is not a product obtained by working the first magnetic recording layer which is the ordered alloy—carbon as a template layer, and on this template layer, forming/growing a granular structure of non-magnetic material constituted by an ordered alloy—boron and carbon as the second magnetic recording layer, according to the present invention.

Moreover, PTL 5 discloses that the magnetic recording layer having a CuAu-type ordered structure made of $F_{1-x}M_x$ composition and containing a ferromagnetic body with a B presence rate in $F_{1-x}M_x$ of 0.01 to 0.30 in a non-magnetic matrix is formed and then, it is subjected to heat treatment at 200 to 600° C. (Claims 10 and 16 and the like in PTL 5). In the Example of PTL 5, an FePt alloy film with the B presence rate of 0 to 0.35 obtained by sputtering using a target of Fe—50 at. % Pt with a B chip arranged is fabricated as $F_{1-x}M_x$, and after that, it is heated at 350° C. for 0.5 hours in the vacuum at $1\times10^{-6}$ Torr or less (the paragraph 0032 in PTL 5). However, it is not a product obtained by working the first magnetic recording layer which is the ordered alloy—carbon as a template layer, and on this template layer, forming/growing a granular structure of non-magnetic material constituted by an ordered alloy—boron and carbon as the second magnetic recording sub-layer, according to the present invention. Moreover, it does not disclose whether the FePt alloy film with the B presence rate of 0 to 0.35 contains the non-magnetic material constituted by boron and carbon or not and even if it contains some, it does not disclose what a content of C is.

Moreover, neither of PTLs 4 and 5 has explicit description on improvement of the $\alpha$ value of the magnetic recording medium to be obtained and further homogenization of the magnetic characteristics.

[Other Arbitrary Steps]

In a manufacturing method of a perpendicular magnetic recording medium of one configuration example of the present invention, a step of forming an arbitrary layer other than the aforementioned steps (A) to (C) may be further included, as will be enumerated below.

In these arbitrary layers, a seed layer, a non-magnetic underlayer, a second underlayer, an adhesion layer and the like are formed before the step (B) which is a forming step of the magnetic recording layer, while a protective layer, a liquid lubricant layer and the like are formed after the step (B).

Among the layers formed after the step (B), the liquid lubricant layer is formed after the step (C). The protective layer or the like can be formed before or after the step (C), but in view of prevention of diffusion of the magnetic recording layer, it is preferably formed after the step (C).

Soft Magnetic Underlayer

The soft magnetic underlayer is a layer having a function of concentrating a magnetic flux generated by a magnetic head to the magnetic recording layer during recording in the magnetic recording layer. The soft magnetic underlayer can be formed on the non-magnetic substrate by using a crystalline material such as FeTaC, a sendust (FeSiAl) alloy and the like or an amorphous material containing a Co alloy such as CoZrNb, CoTaZr, CoFeZrTa and the like. In this case, there is a need to select a material that does not generate a change in surface roughness by crystallization at a formation temperature of the magnetic layer.

An optimal value of a film thickness of the soft magnetic underlayer changes depending on a structure and a characteristic of the magnetic head used for the recording, but it is preferably approximately 10 nm or more and 500 nm or less, taking into consideration of productivity.

The soft magnetic underlayer can be formed by a well-known and common film forming technology such as a sputtering method, for example.

Seed Layer

A function of seed layer 40 is to control crystal orientation and the like of the magnetic crystal grains in magnetic recording layer 60 which is an upper layer. Moreover, seed layer 40 is preferably a non-magnetic body.

More specifically, seed layer 40 is a layer with the purpose of orienting the crystal of the ordered alloy in magnetic recording layer 60 (in the case of $L1_0$-type FePt alloy and the like, for example) to (001), for example. Such orientation enables the perpendicular magnetic recording.

In order to achieve the aforementioned function, the material of seed layer 40 is selected as appropriate in accordance with a material of magnetic crystal grains of magnetic recording layer 60. For example, if the magnetic crystal grains of magnetic recording layer 60 are formed of $L1_0$-type ordered alloy, it is preferably a cubical crystal material, particularly preferably $SrTiO_3$, MgO, TiN, CrN and the like, most preferably MgO. Seed layer 40 can be also formed by using a mixture of the aforementioned oxides. Seed layer 40 can be also formed by laminating a plurality of layers made of the aforementioned materials. In view of improvement of crystalline properties of the magnetic crystal grains of magnetic recording layer 60 and improvement of productivity, seed layer 40 preferably has a film thickness of from 1 nm to 60 nm, more preferably of from 1 to 20 nm.

The aforementioned seed layer 40 can be formed by an arbitrary method known in the technology such as the sputtering method (including the DC magnetron sputtering method, the RF sputtering method and the like), vacuum deposition method and the like.

Non-Magnetic Underlayer

A non-magnetic underlayer can be formed on non-magnetic substrate 20, and then, seed layer 40 can be formed.

The non-magnetic underlayer is a layer with the purpose of ensuring close contact between the soft magnetic underlayer and seed layer 40, and of ensuring that seed layer 40 can obtain desired orientation.

The non-magnetic underlayer can be formed by using Cr or an alloy containing Cr. The non-magnetic underlayer may have a lamination structure made of a plurality of layers of NiW, Ta, and Cr or an alloy containing Ta and/or Cr. Considering improvement of crystalline properties of seed layer 40 and magnetic recording layer 60, productivity improvement, and optimization to the magnetic field generated by the head during recording, the non-magnetic underlayer preferably has a film thickness of 5 nm or more and 30 nm or less.

Aforementioned non-magnetic underlayer can be formed by using an arbitrary method known in the technology such as the sputtering method (including the DC magnetron sputtering method, the RF sputtering method and the like), vacuum deposition method and the like.

Second Underlayer

The second underlayer can be formed below the non-magnetic underlayer. The second underlayer is a layer provided to shut off an influence of the crystal structure of a layer formed below the second under-layer, on crystal orientation and a size of the magnetic crystal grain and the like of magnetic recording layer 60. Moreover, if the soft magnetic underlayer is provided, there is a need that the second under-layer be non-magnetic in order to suppress a magnetic influence on the soft magnetic underlayer. A material for forming the second underlayer includes oxides such as MgO and $SrTiO_3$, nitrides such as TiN, metal such as Cr and Ta, a Niw alloy, and Cr-based alloys such as CrTi, CrZr, CrTa and CrW. Seed layer 30 can be formed by using an arbitrary method known in the technology such as the sputtering method.

Adhesion Layer

An adhesion layer made of a material excellent in adhesiveness such as metal including Ta and Cr or their metal alloys such as CrTi, can be formed on the non-magnetic substrate represented by a glass substrate, as necessary.

Protective Layer

Protective layer 80 can be formed on magnetic recording layer 60. The protective layer is a layer for protecting magnetic recording layer 60 and each of other constituent layers below the protective layer.

Protective layer 80 can be formed by using a material usually used in a field of magnetic recording mediums such as a material mainly composed of carbon and non-magnetic metal such as Pt and Ta, for example. Protective layer 80 may be a single layer or may have a lamination structure. Protective layer 80 with the lamination structure may have a lamination structure of two kinds of carbon-based materials with different characteristics, a lamination structure of metal and a carbon-based material or a lamination structure of a metal oxide film and a carbon-based material, for example. A film thickness of the protective layer is preferably 10 nm or less typically.

Protective layer 80 can be formed by using an arbitrary method known in the technology such as the sputtering method (including the DC magnetron sputtering method and the like), vacuum deposition method and the like with using the aforementioned materials.

Liquid Lubricant Layer

Moreover, a liquid lubricant layer can be optionally formed by using a material (perfluoropolyether lubricant, for example) usually used in a field of the magnetic recording medium. The liquid lubricant layer can be formed by using an application method such as a dip coat method and a spin coat method.

A film thickness of the liquid lubricant layer is preferably a film thickness that can exert a function of the liquid lubricant layer, considering a film property and the like of the protective layer.

Others

In the aforementioned manufacturing method, in addition to the aforementioned various layers, other various layers for the perpendicular magnetic recording medium may be formed as appropriate. For example, in a thermal assist type perpendicular magnetic recording medium, a heat sink layer or the like can be further formed below or on the magnetic recording layer. Moreover, an additional layer such as a CAP layer can be laminated on magnetic recording layer 60.

EXAMPLE

The manufacturing method of a configuration example of the present invention will be described below in more detail by using Examples.

Examples 1 to 3, Comparative Examples 1 to 2

In Examples 1, 2, 3 and Comparative Examples 1 to 2, respective magnetic recording mediums were obtained by performing lamination with a layer constitution A below.

Layer Constitution A

MgO substrate/
FePt—C (40 vol. %) (film thickness: 2 nm)/
FePt—B (20 vol. %)-C (5 vol. %) (film thickness: 5 nm)

In the layer constitution A, an MgO substrate (by Tateho Chemical Industries Co., Ltd.) was used as a non-magnetic substrate, and directly on the substrate, a first magnetic recording layer (FePt—C layer) and then, a second magnetic recording layer (FePt—B—C layer) were formed, and film formation of each layer in the layer constitution A was performed by introducing the non-magnetic substrate into a sputtering device and in the order indicated in the layer constitution A by an in-line type film forming device without release to the air.

More specifically, first, the first magnetic recording layer (FePt—C layer) was formed by DC power 40 W (FePt target) and 232 W (C target) respectively in an Ar gas atmosphere with a degree of vacuum at 1.5 Pa. That is, the substrate on which each of the aforementioned layers to be formed was heated to 430° C. and subjected to co-sputtering by the DC magnetron sputtering method with using the FePt target and the C target so that a composition in film formation has a carbon content of 40 vol. % to result in the formation of the first magnetic recording layer having a film thickness of 2 nm.

After the film formation of the first magnetic recording layer, the second magnetic recording layer (a layer of FePt-non-magnetic material, the non-magnetic material being constituted by boron and carbon) was formed in the Ar gas atmosphere at the degree of vacuum of 1.5 Pa with DC power 40 W (FePt target), 47 W (C target) and RF power 220 W (B target). That is, in a state in which the substrate on which the first magnetic recording layer was formed was heated to 430° C. as above, the second magnetic recording layer with a film thickness of 5 nm was formed by the DC magnetron sputter (FePt target and C target) and the RF magnetron sputter method (B target) using the FePt target, the C target, and the B target so that a boron content is 20 vol. % and the carbon content is 5 vol. %.

Example 4, Comparative Example 3

Respective magnetic recording mediums in Example 4 and Comparative Example 3 were obtained by performing lamination with the layer constitution B below.
Layer Constitution B
 Glass substrate/
 Ta (film thickness: 5 nm)/
 MgO (film thickness: 5 nm)/
 Cr (film thickness: 20 nm)/
 MgO (film thickness: 5 nm)/
 FePt—C (40 vol. %) (film thickness: 2 nm)/
 FePt—B (17 vol. %)-C (5 vol. %) (film thickness: 5 nm)

In the layer constitution B, a glass substrate [Chemical strengthened glass substrate (N-10 glass substrate by HOYA CORPORATION)] was used as a non-magnetic substrate, and after a Ta adhesion layer, an MgO second underlayer, a Cr underlayer, and an MgO seed layer were laminated in this order, a first magnetic recording layer (FePt—C layer) and a second magnetic recording layer (FePt—B—C layer) were formed.

Film formation of each layer in the layer constitution B was performed in the order indicated in the layer constitution B by introducing the non-magnetic substrate into the sputter device with the in-line type film forming device without release to the air.

More specifically, first, the Ta adhesion layer with a film thickness of 5 nm was formed by the DC magnetron sputter method with a pure Ta target in an Ar atmosphere.

Regarding the MgO second underlayer, the seed layer with a film thickness of 5 nm was formed by the RF sputtering method with MgO target at a room temperature. More specifically, in the Ar gas atmosphere with the degree of vacuum of 0.1 Pa, film formation was performed with RF power 200 W.

The Cr under-layer with a film thickness of 20 nm was formed by the DC magnetron sputter method with a pure Cr target in an Ar atmosphere.

Regarding the MgO seed layer, the substrate was heated to 300° C. and the seed layer with the film thickness of 5 nm was formed by the RF sputtering method with MgO target. More specifically, the film formation was performed with RF power 200 W in an Ar atmosphere with the degree of vacuum of 0.1 Pa.

Regarding the first magnetic recording layer (FePt—C layer), the substrate on which each of the aforementioned layers was formed was heated to 400° C., and the first magnetic recording layer with film thickness of 2 nm was formed by the DC magnetron sputter method with a target containing FePt and C prepared so that a composition has a carbon content of 40 vol. % in film formation. More specifically, the film formation was performed with DC power 100 W in an Ar gas atmosphere with the degree of vacuum of 1.0 Pa.

After film formation of the first magnetic recording layer, the second magnetic recording layer (a layer of FePt-non-magnetic material, the non-magnetic material being constituted by boron and carbon) was formed. That is, while the substrate on which the first magnetic recording layer was formed was heated to 400° C. as above, the second magnetic recording layer with film thickness of 5 nm was formed by the DC magnetron sputter method with a target containing a non-magnetic material constituted by FePt, boron and carbon prepared so that the boron content is 17 vol. % and the carbon content is 5 vol. %. More specifically, the film formation was performed with DC power 100 W in an Ar gas atmosphere with the degree of vacuum of 1.0 Pa.

Heat Processing of Step (C) of Examples 1 to 4 and Comparative Example 1

For any of Examples 1 to 4 and Comparative Example 1, a non-magnetic substrate on which a first and a second magnetic recording layers were formed was heated by using a lamp heating furnace (MILA-3000) by ULVAC Rico Inc. in a vacuum at the degree of $5\times10^{-4}$ Pa or less under heating conditions indicated in Table 1 below. The temperature was raised to a target temperature in 30 seconds, and the temperature was dropped by natural cooling to obtain respective magnetic recording mediums in Examples 1 to 4 and Comparative Example 1.

By contrast, the heat processing in the step (C) after the film formation of the magnetic recording layer was not performed in Comparative Examples 2 and 3.

TABLE 1

| Example | Layer constitution | Heating temperature (° C.) | Heating time |
|---|---|---|---|
| Example 1 | A | 450 | 1000 seconds |
| Example 2 | A | 600 | 1000 seconds |
| Example 3 | A | 500 | 2 hours |
| Comparative Example 1 | A | 750 | 1000 seconds |
| Comparative Example 2 | A | — | — |
| Example 4 | B | 400 | 2 hours |
| Comparative Example 3 | B | — | — |

Comparative Examples 4 and 5

In accordance with the fabricating method of the layer constitution B, Comparative Example 4 and Comparative Example 5 (film thicknesses of the magnetic recording layers are different from each other) which are magnetic recording mediums with the layer constitution C below (the magnetic recording layer has only a single magnetic recording layer corresponding to the first magnetic recording layer) were fabricated.

However, a carbon protective film (film thickness: 3 nm) which is not present in the layer constitution B is also formed in the layer constitution C. The carbon protective film was formed by the DC magnetron sputtering method with a carbon target in an Ar gas atmosphere.
Layer Constitution C
 Glass substrate/
 Ta (film thickness: 5 nm)/
 Cr (film thickness: 20 nm)/
 MgO (film thickness: 5 nm)/
 FePt—C (25 vol. %) [film thickness: 7.8 nm (Comparative Example 4) or 4.5 nm (Comparative Example 5)]/
 C (film thickness: 3 nm)

Similarly to Comparative Examples 2 and 3, the heat processing in the step (C) after film formation of the magnetic recording layer was not performed.

Comparative Example 6

Comparative Example 6 which is a magnetic recording medium with the layer constitution D below (the magnetic recording layer has a single magnetic recording layer only, the layer corresponding to the second magnetic recording layer) was fabricated, in accordance with a fabricating method similar to that of the layer constitution B.

However, a carbon protective film (film thickness: 3 nm) which is not in the layer constitution B is also formed in the layer constitution D. The carbon protective film was formed by the DC magnetron sputtering method with a carbon target in an Ar gas atmosphere.

Layer Constitution D

Glass substrate/
Ta (film thickness: 5 nm)/
Cr (film thickness: 20 nm)/
MgO (film thickness: 5 nm)/
FePt—B (20 vol. %)-C (5 vol. %) (film thickness: 4 nm)/
C (film thickness: 3 nm)

(Magnetic Performance Evaluation)

Evaluation of a magnetic recording medium was made by evaluating the magnetic anisotropy constant (Ku). Specifically, Ku values were calculated on the basis of NPLs 3 and 4 with dependence of spontaneous magnetization on applied angle of magnetic-field acquired by PPMS device (Physical Property Measurement System by Quantum Design Inc.) and saturation magnetization (Ms) acquired with a sample vibration type magnetometer (VSM).

In addition to the magnetic anisotropy constant, coercive force (Hc), α value (gradient of the magnetization curve in the vicinity of the coercive force) of a magnetic hysteresis curve [vertical axis: magnetization M (emu/cm$^3$), lateral axis: external magnetic field H (Oe)] and grain size (Dn) of a magnetic grain were estimated, the grain size (Dn) being calculated with an activation volume V. The α value of a magnetic hysteresis curve is known to be α=1 in the case of an ideal granular medium.

In a specific measuring method, α value was calculated with a gradient (dM/dH) in the vicinity of a coercive force (Hc) after evaluating a magnetic hysteresis curve by the PPMS device and a saturation magnetization (Ms) obtained by VSM.

Moreover, the grain size (Dn) of a magnetic grain was calculated by acquiring an activation volume $V_{act}$, being divided by a film thickness and then converting this divided value to a radius under an assumption that the magnetic grain has a columnar shape (see NPL 5). The activation volume $V_{act}$ was calculated from frequency dependence of a coercive force (see NPL 6).

The results are summarized in Table 2.

TABLE 2

| | Layer constitution (single/plural of magnetic recording layer[*1]) | Step (C) heating temperature (° C.) | Film thickness (nm) of magnetic recording layer | I[*1]c Coercive force Hc (kOe) | Magnetic anisotropy constant Ku (10$^6$ erg/cm$^3$) (10$^5$ J/m$^3$) | α value | Magnetic grain size Dn (nm) |
|---|---|---|---|---|---|---|---|
| Example 1 | A (plural) | 450 | 7 | 14.93 | 14.3 | 0.91 | 6.25 |
| Example 2 | A (plural) | 600 | 7 | 14.38 | 16.5 | 1.29 | 6.20 |
| Example 3 | A (plural) | 500 | 7 | — | 15.2 | 0.99 | 6.1 |
| Comparative Example 1 | A (plural) | 750 | 7 | 20.59 | 32.3 | 3.1 | 8.17 |
| Comparative Example 2 | A (plural) | —[*2] | 7 | 14.95 | 12.4 | 0.67 | 6.35 |
| Example 4 | B (plural) | 400 | 7 | 18.5 | 18.4 | 1.33 | 6.62 |
| Comparative Example 3 | B (plural) | —[*2] | 7 | — | 15.7 | 0.79 | 7.60 |
| Comparative Example 4 | C (single) | —[*2] | 7.8 | 9.3 | 6.35 | 0.4 | — |
| Comparative Example 5 | C (single) | —[*2] | 4.5 | 9.3 | 9.87 | 0.4 | — |
| Comparative Example 6 | D (single) | —[*2] | 4 | 1.2 | 5.11 | 7.4 | — |

[*1]Plural: Having the first magnetic recording layer and the second magnetic recording layer. Single: Having a single magnetic recording layer.
[*2]Not including the heating step in the step (C).

As is obvious from the aforementioned Table 2, all Examples 1 to 4 in which the heat processing of the step (C) at a temperature of 400 to 600° C. was performed showed favorable α values within a range from 0.8 to 2.0, indicating favorable homogeneity of the magnetic characteristics. The values of magnetic anisotropy constant of these Examples also indicate favorable values ranging from 14.3 to 18.4×10$^6$ erg/cm$^3$.

Particularly when Example 2 and Comparative Example 2 having the same layer constitution A are compared with each other, Comparative Example 2 in which the heat processing of the step (C) was not performed showed the α value of 0.67 which is considerably lower than an ideal value 1, indicating that the magnetic characteristics are considered to be in a non-uniform state. Meanwhile, Example 2 in which the heat processing of the step (C) was performed particularly at 600° C. showed the α value of 1.29 which is a value not smaller than 1, indicating that the magnetic characteristics are considered to be in a uniform state. Moreover, the value is close to an ideal value 1, indicating that and the magnetic grains in the formed magnetic recording layer are not enlarged.

Similarly, when Example 4 and Comparative Example 3 having the same layer constitution B are compared with each other, Comparative Example 3 in which the heat processing of the step (C) was not performed showed the α value of 0.79 which is lower than an ideal value 1, indicating that the magnetic characteristics are considered to be in a non-uniform state. Meanwhile, Example 4 in which the heat processing of the step (C) was performed (400° C.) shoed the α value of 1.33 which is a value not smaller than 1, indicating that the magnetic characteristics are considered to be in a uniform state. Moreover, the value is close to an ideal value 1, indicating that the magnetic grains in the formed magnetic recording layer are not enlarged.

In both the Example 2 and Comparative Example 2 having the same layer constitution A, the heat processing of the step (B) at 430° C. was similarly performed in film formation of the first and second magnetic recording layers. In both the Example 4 and Comparative Example 3 having the same layer constitution B, the heat processing of the step (B) at 400° C. was similarly performed as well in film formation of the first and second magnetic recording layers. These facts indicate that improvement of homogenization of the magnetic characteristics cannot be expected with the heat processing of the film formation of the magnetic recording layer of the step (B), instead of the heat processing after the film formation of the magnetic recording layer of the step (C).

Meanwhile, Comparative Example 1 showed that the α value was larger than the preferable range, indicating that the magnetic particles were enlarged, although the magnetic anisotropy constant was considerably high. That is because the heating temperature of the step (C) was considered to be too high.

Comparative Examples 4 and 5 are magnetic recording mediums having a magnetic recording layer corresponding to the first magnetic recording layer only, and although it cannot be simply compared with the layer constitution of Examples, the α values of these comparable examples were lower than its preferable range. Moreover, as compared with Examples 1 to 4, they are also considered to be inferior to Examples 1 to 4 in terms of the magnetic anisotropy constant.

Comparative Example 6 is a magnetic recording medium having a magnetic recording layer corresponding to the second magnetic recording layer, and although it cannot be simply compared with the layer constitution of Examples, the α value of this comparable example was much larger than the preferable range of the α value. Moreover, as compared with Examples 1 to 4, it is also considered to be inferior to Examples 1 to 4 in terms of the magnetic anisotropy constant.

Figure 5:
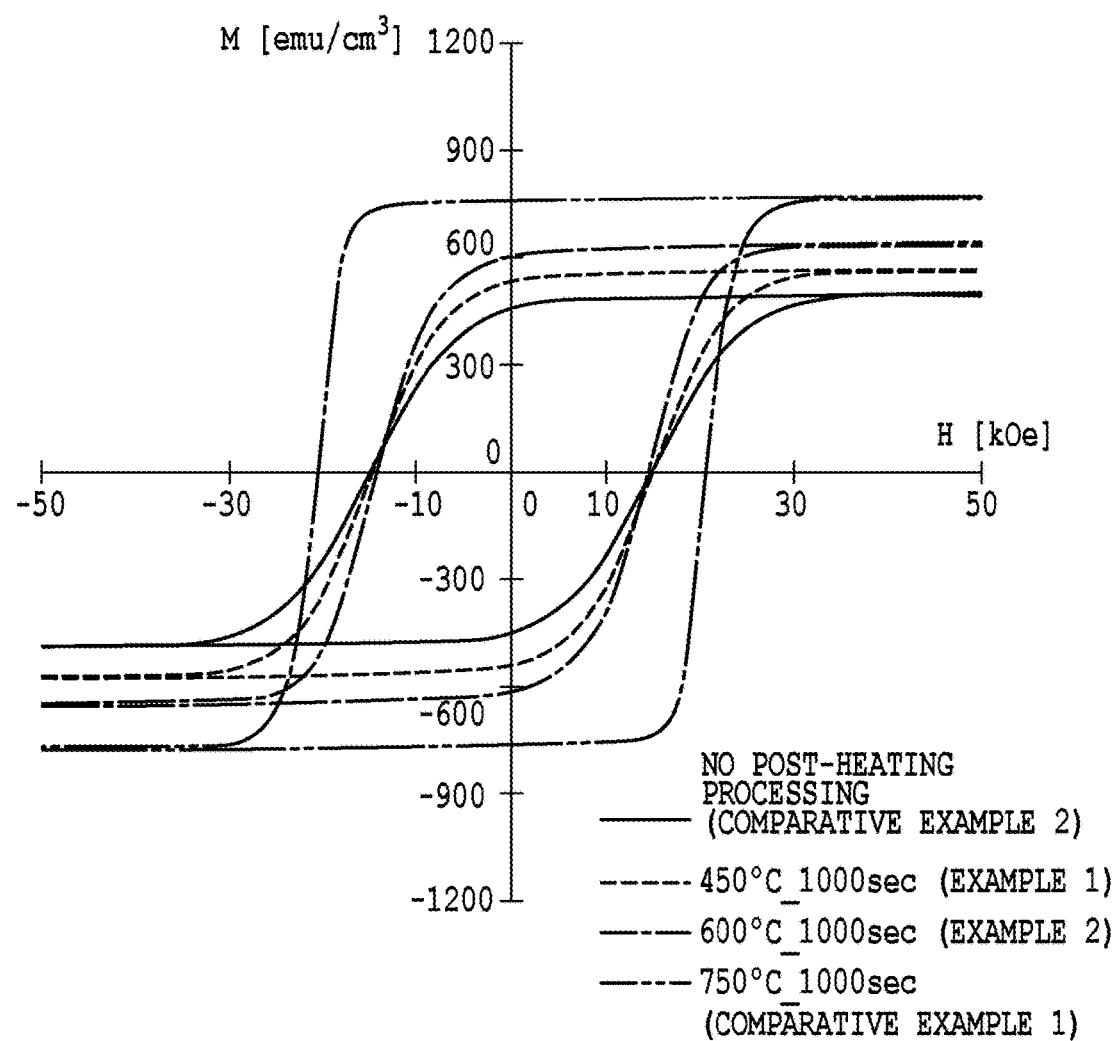
FIG. 5 is a magnetic hysteresis curve [vertical axis: magnetization M (emu/cm$^3$), lateral axis: external magnetic field H (Oe)] of each of magnetic recording mediums of a layer constitution A manufactured by a manufacturing processes of Example 1, Example 2, Comparative Example 1, and Comparative Example 2.

FIG. 5 illustrates magnetic hysteresis curves with the vertical axis for the magnetization M (emu/cm$^3$) and the lateral axis for the external magnetic field H (Oe) of Examples 1 and 2 and Comparative Examples 1 and 2 having the layer constitution A. The α value which is a gradient of the magnetization curve in the vicinity of the coercive force increases, as heat processing temperature rises, as shown in Comparative Example 2 without the heat processing of the step (C), Example 1 with the heat processing temperature of the step (C) at 450° C., Example 2 with the heat processing temperature of the step (C) at 600° C. and Comparative Example 1 with the heat processing temperature of the step (C) at 750° C. This indicates a homogenization tendency of the magnetic characteristics. However, Example 2 is most preferable from the view point that the magnetic characteristics are homogenized within a range in which the magnetic grains are not enlarged.

Figure 6A:
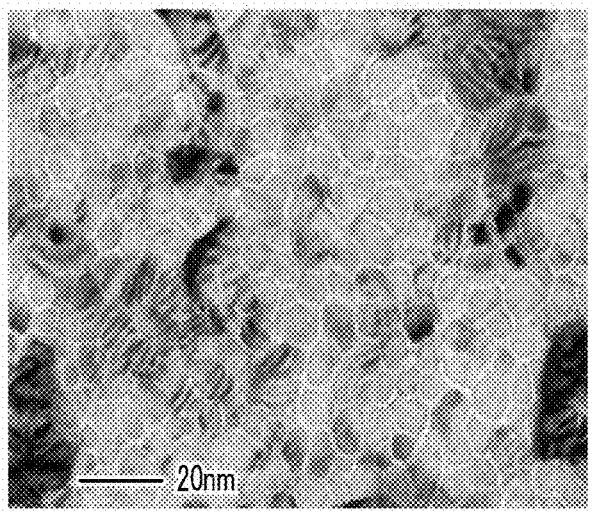
FIG. 6A is a planar TEM observation photograph of a magnetic recording medium with a layer constitution B manufactured by a manufacturing process of Comparative Example 3; and reference characters <D> and σ in the figure indicate an average grain size and standard deviation obtained by grain size analysis of the planar TEM observation image, respectively.
Figure 6B:
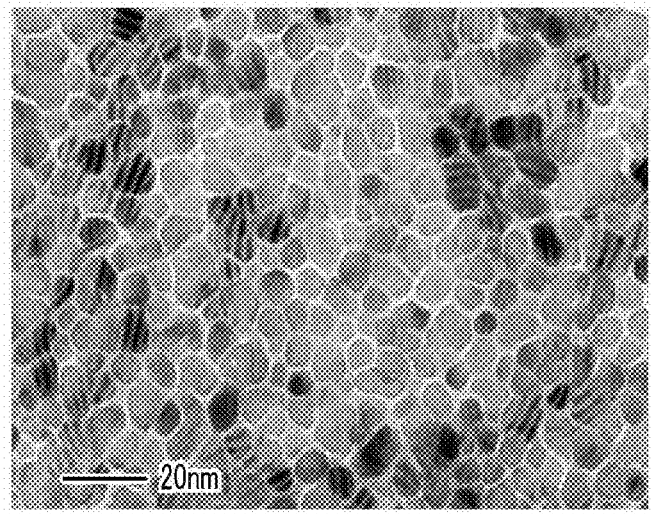
FIG. 6B is a planar TEM observation photograph of the magnetic recording medium with the layer constitution B manufactured by a manufacturing process of Example 4; and reference characters <D> and σ in the figure indicate an average grain size and standard deviation obtained by grain size analysis of the planar TEM observation image, respectively.
Figure 7A:
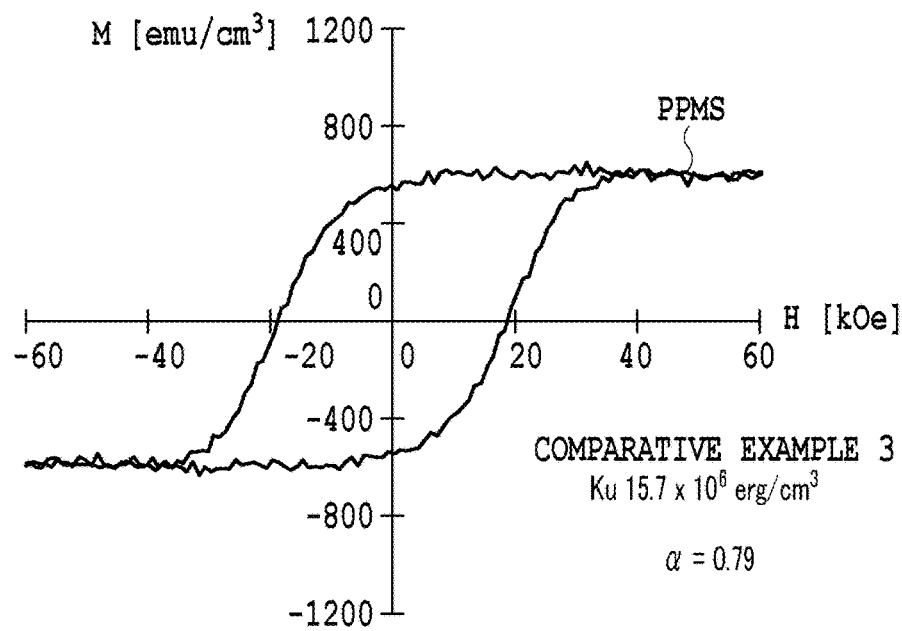
FIG. 7A is a magnetic hysteresis curve [vertical axis: magnetization M (emu/cm$^3$), lateral axis: external magnetic field H (Oe)] of the magnetic recording medium of the layer constitution B manufactured by a manufacturing process of Comparative Example 3.
Figure 7B:
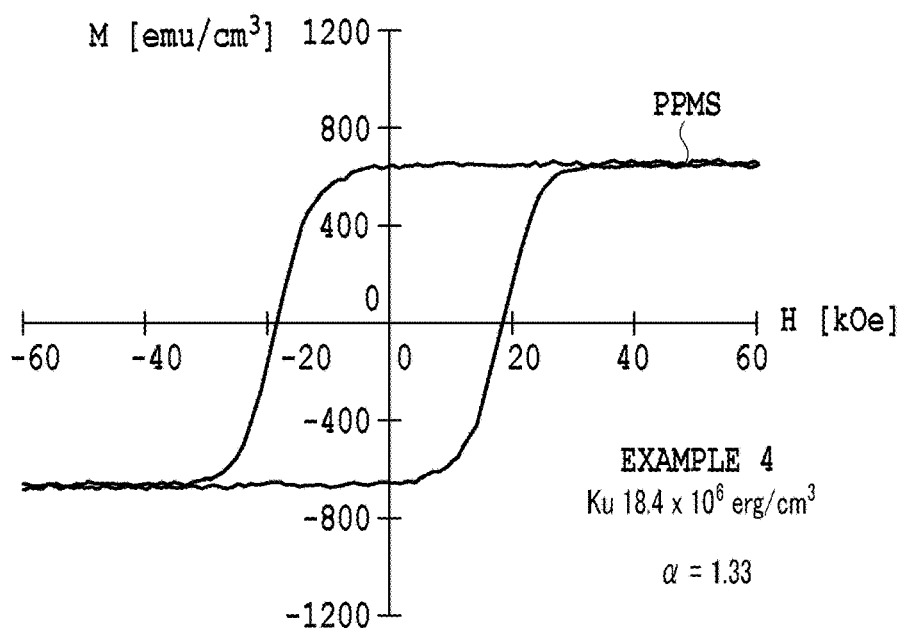
FIG. 7B is a magnetic hysteresis curve [vertical axis: magnetization M (emu/cm$^3$), lateral axis: external magnetic field H (Oe)] of the magnetic recording medium of the layer constitution B manufactured by a manufacturing process of Example 4.

FIGS. 6A and 6B and FIGS. 7A and 7B illustrate planar TEM observation photographs and the magnetic hysteresis curves with the vertical axis for the magnetization M (emu/cm$^3$) and the lateral axis for the external magnetic field H (Oe) of the magnetic recording mediums obtained by the manufacturing methods in Comparative Example 3 [FIGS. 6A and 7A] and Example 4 [FIGS. 6B and 7B], both having the layer constitution B. Comparative Example 3 is a case in which the heat processing of the step (C) is omitted in Example 4, but both of the average grain sizes <D> are substantially the same, judging from FIGS. 6A and 6B. It indicates that enlargement of the grains by the heat processing of the step (C) does not occur. FIGS. 7A and 7B show that the α value which is a gradient of the magnetization curve in the vicinity of a coercive force increased from 0.79 to 1.33 by the heat processing of the step (C), indicating that homogenization of the magnetic characteristics occurred.

INDUSTRIAL APPLICABILITY

The manufacturing method of the magnetic recording medium as one configuration example of the present invention can provide a magnetic recording medium that can be used in a magnetic recording device such as a perpendicular magnetic recording medium including energy assist type magnetic recording medium such as a thermal assist type, a micro-wave assist type and the like.

REFERENCE SIGNS LIST 20 non-magnetic substrate
40, 210 seed layer
60 magnetic recording layer
62 first magnetic recording layer
64 second magnetic recording layer
80 protective layer
100 magnetic recording medium
200 magnetic crystal grain
230 first component of ordered alloy
250 second component of ordered alloy
270 non-magnetic grain boundary
290, 292, 294 axis of easy magnetization
320 non-magnetic grain boundary
400 mixed region of magnetic crystal grain (200) and non-magnetic material (320)

The invention claimed is:
1. A method for manufacturing a perpendicular magnetic recording medium, comprising the steps of:
(A) preparing a non-magnetic substrate;
(B) laminating magnetic recording layer including at least a first and a second magnetic recording layers on the non-magnetic substrate; and
(C) after the formation of the magnetic recording layer in the step (B), heating the non-magnetic substrate on which the magnetic recording layer is laminated to a temperature of 400 to 600° C., wherein
the step (B) includes at least a step of forming the first magnetic recording layer and a step of forming the second magnetic recording layer on the first magnetic recording layer;
the first magnetic recording layer has a granular structure including a first magnetic crystal grain and a first non-magnetic grain boundary surrounding the first magnetic crystal grain, the first magnetic crystal grain is composed of an ordered alloy, and the first non-magnetic grain boundary is composed of carbon; and
the second magnetic recording layer has a granular structure including a second magnetic crystal grain and a second non-magnetic grain boundary surrounding the second crystal grain, the second magnetic crystal grain is composed of an ordered alloy, and the second non-magnetic grain boundary is composed of a non-magnetic material constituted by boron and carbon.
2. The method for manufacturing a perpendicular magnetic recording medium according to claim 1, wherein heating time of the step (C) is from 10 seconds to 2 hours.
3. The method for manufacturing a perpendicular magnetic recording medium according to claim 1, wherein a ratio [B (at. %)/C (at. %)] based on the atomic percent ratio of boron and carbon in the non-magnetic material constituted by boron and carbon is 0.3 to 10.

4. The method for manufacturing a perpendicular magnetic recording medium according to claim 1, wherein
the ordered alloys contained in the first and second magnetic crystal grains are $L1_0$-type ordered alloys which are the same with or different from each other.

5. The method for manufacturing a perpendicular magnetic recording medium according to claim 4, wherein
the $L1_0$-type ordered alloys contain Fe and Pt.

6. The method for manufacturing a perpendicular magnetic recording medium according to claim 1, wherein
the non-magnetic substrate of the step (A) includes a seed layer, and the step (B) includes a step of forming the first magnetic recording layer on the seed layer.

7. The method for manufacturing a perpendicular magnetic recording medium according to claim 1, wherein
an α value of a magnetic hysteresis curve [vertical axis: magnetization (emu/cm$^3$), lateral axis: external magnetic field (Oe)] of the perpendicular recording medium to be manufactured is 0.8 to 2.0.

8. The method for manufacturing a perpendicular magnetic recording medium according to claim 1, wherein
the second non-magnetic grain boundary is composed of two-component materials of boron and carbon; and
a ratio [B (at. %)/C (at. %)] based on the atomic percent ratio of boron and carbon in the non-magnetic material constituted by boron and carbon is 0.4 to 10.

9. The method for manufacturing a perpendicular magnetic recording medium according to claim 1, wherein
film thickness of the first and the second magnetic layers are 2 to 4 nm and 3 to 7 nm, respectively.

* * * * *